United States Patent [19]

Scarpellino

[11] 4,018,907

[45] Apr. 19, 1977

[54] COLORING FOOD WITH IRON-COMPLEXES

[75] Inventor: Richard J. Scarpellino, Ramsey, N.J.

[73] Assignee: General Foods Corporation, White Plains, N.Y.

[22] Filed: Aug. 25, 1975

[21] Appl. No.: 607,409

[52] U.S. Cl. ................................. 426/250; 426/540
[51] Int. Cl.$^2$ ........................................... A23L 1/27
[58] Field of Search ......................... 426/250, 540; 260/345.9

[56] References Cited

UNITED STATES PATENTS 3,165,535  1/1965  Kehol .............................. 260/345.9

OTHER PUBLICATIONS

Chemical Abstracts vol. 75 "Synthesis of Maltol Iron (III) Complexes", 115362k 1970, Kidani.

*Primary Examiner*—Jeanette M. Hunter
*Attorney, Agent, or Firm*—Thaddius J. Carvis; Daniel J. Donovan; Bruno P. Struzzi

[57] ABSTRACT

The reaction of ferric ions with compounds having a 3 or 5-hydroxy-4-pyrone structure produce novel water soluble red to burgundy colors which are used to color foodstuffs such as beverages and pet foods.

12 Claims, No Drawings

COLORING FOOD WITH IRON-COMPLEXES

BACKGROUND OF THE INVENTION

The present invention relates to novel coloring compositions particularly appropriate for use in edible materials and the method for producing the same. More specifically, the immediate invention relates to the discovery of new non-toxic colors obtained by complexing 3 or 5-hydroxy-4-pyrone-structured compounds such as the known flavoring agent, 3-hydroxy-2-methyl-4-pyrone, hereinafter referred to as "Maltol" with ferric ions as contained in ferric salts.

The need for stable red colors of high intensity has existed for some time. This need has been accentuated in recent years due to an increased awareness of the need to further evaluate the physiological effects, if any, artificial colors have on the consumer. Since the number of artificial colors is limited and their safety questioned and since natural pigments are both unstable and expensive, the need for new and improved coloring systems is apparent.

While it is generally known that ferric salts form complexes with certain phenolic compounds to form red to burgundy hues, as in ink, and that even impurities in the phenol itself will contribute a reddish-pink hue, the fact that 3 to 5-hydroxy-4-pyrone-structured compounds render a red color only in the presence of a ferric ion and not with impurities in the 3 to 5-hydroxy-4-pyrone-structured compound, itself, is new to the art.

SUMMARY OF THE INVENTION

I have found that 3 and 5-hydroxy-4-pyrone-structured compounds such as maltol, ethyl maltol, isomaltol and Kojic acid as well as combinations thereof when combined with a ferric ion, complex therewith to form intensely colored compositions of varying red to burgundy hue, which compositions are non-toxic, water soluble and in most instances stable. The fact that those 3 or 5-hydroxy-4-pyrone-structured compounds currently employed in the art as flavor enhancers have now been found to have color-forming properties when complexed with a ferric ion, provide novel colored flavor enhancers never before known to the art to possess both of these properties.

Accordingly, the principal object of the present invention is to provide new and improved red coloring agents which, due to the non-toxicity and increased stability, are particularly suitable for use in any edible material.

DETAILED DESCRIPTION OF THE INVENTION

The iron complex red colors of the immediate invention are formulated by combining at least equimolar amounts of a ferric salt or salts with a 3 or 5-hydroxy, 4-pyrone-structured compound or combination thereof.

The variance in color hue depends upon the pH of the system and the intensity of the same depends upon the ratio of each color component to the other; the lower the pH the more burgundy the color and conversely, the higher the pH the more red obtained. In all instances, the higher the ratio of maltol or maltol-like compound to iron, the deeper the hue. Conversely, the lower the ratio, the less intense the red color, with a yellow to orange color obtained where the iron is present in major amounts, regardless of the pH of the system. However, since increased iron fortification is possible in such instances and since iron fortification is currently being challenged by segments of the medical profession, employment of this color complex is best used where a red color is desired and consequently where lesser amounts of iron are necessitated. Where a rich red color is desired, particularly for use in a fruit-flavored beverage, the pH found to be best suited is ordinarily from about 2.5 to 4.

While the 3 or 5-hydroxy, 4-pyrone structure is believed to be critical, the toxicity and solubility of only those compounds currently employed as flavor enhancers is presently known. Therefore, where these coloring agents are to be employed in edible materials such as pharmaceuticals, or foodstuffs such as beverages, or even pet foods, the compounds preferably employed are maltol, ethyl maltol, isomaltol, kojic acid or mixtures thereof, maltol and ethyl maltol being most preferred in terms of intensity of color, stability and the fact that they are already approved for use in food.

The sources of iron employed are generally those in which the iron is known to exist in the ferric state or ionize thereto on dissolution. For the best results, iron salts are employed, ferric chloride being the most satisfactory source of iron from both toxicity and solubility standpoints; ferric sulfate and ferric nitrate providing satisfactory color; ferric phosphate being least preferable due to the presence of phosphate itself which forms preferential complexes with iron. Use of ferric chloride as the iron source is particularly preferred where it is to be employed in an animal food where ferric chloride has already been FDA approved for use therein.

Since ferric ions interact with many food ingredients, the food system in which the coloring agents of this invention are to be employed should not contain ingredients known in the art to strongly and preferentially complex with iron such that the ferric ions will be sequestered to the ferrous ion state resulting in either lack of color formation or a loss of the color already formed. Exemplary of such reducing compounds are ascorbic acid (vitamin C), the phosphates such as the monocalcium phosphates, aminopolycarboxylic acids such as ethylene-diaminetetra acetic and certain hydroxy-carboxylic acids such as gluconic, citric and tartaric acid, as well as other known chelating agents such as nitrilotriacetic acid and ethyleneglycol-bis (beta-amino ethyl ether) N,N-tetra acetic acid. Accordingly, food systems such as beverages in which these colors are to be employed should be reformulated to delete the reducing agent(s) present and make an adequate substitution therefor if necessary.

The color constituents may be combined in any number of ways. Where the color is to be employed as a powder, the iron-complex color may be generated in aqueous or non-aqueous solution such as polyhydric alcohols e.g. glycerol, propylene glycol, 1,3-butylene glycol, sorbitol, mannitol, xylitol, and the like. The solution is then dried as by freeze-drying, spray-drying, drum drying or the like either by itself or on a water soluble carbohydrate, for example, a dextrin such as the commercially well-known Mor-Rex, polyglucose, polymaltose, polymaltodextrins, invert sugars, and water soluble corn syrup solids to mention just a few. The dry colored powder possesses the hue of the generated color and this can be used, for example, where one wishes to color plate the product. Alternatively, the iron source may be separately dried on a water soluble inert bulking agent such as a water soluble carbohydrate or any of the water soluble substances previously mentioned and thereafter dry-mixed with the color-forming component to derive a dry colorless powder which will be stable and colorless until the dry powder is placed in solution where complexation in situ takes place. The essence of the present invention, therefore, rests in the discovery that 3,5-hydroxy-4-pyrone-structured compounds complex only with ferric ions to form desirable red color compounds.

Whether one subsequent to drying decides to reduce the particle size of either powder for reasons of solubility or whatever, this may be done according to methods and parameters well known in the art.

Where the inventive color is to be employed in a liquid system such as a liquid beverage, each component of the complex may be added either sequentially or concurrently to the same so that whether or not iron is fixed on a soluble bulking agent so that the complex is formed in situ, or alternatively, the color complex may be added as a colored powder or formed in either an aqueous or non-aqueous solution in which both components are soluble and the solution added directly to the beverage.

The following examples are intended to be illustrative of the present invention but are not to be construed as limiting in any sense.

EXAMPLE I

A dry powder of intense red color was prepared by combining and thereafter dry blending a 1:2 weight ratio of ferric chloride and maltol. However, after a short period of time small, sticky black spots were apparent on the dry powder due, it is thought, to the hygroscopic nature of ferric chloride.

It has been determined that if one or both components of the color complex are co-dried as by freeze drying with a soluble carbohydrate, i.e. if the iron salt, or the 3 or 5-hydroxy, 4-pyrone-structured compounds are co-dried with the carbohydrate, a more stable, non-hygroscopic dry colored powder is obtained.

This further improvement of the immediate invention is the subject of a patent application herein incorporated by reference entitled "Stabilization of Iron Complexes as Food Colors," General Foods Corporation Docket No. 2360 authored by Dr. Thomas P. Parliment and being filed concurrently with the immediate invention.

EXAMPLE II

A prototype cherry beverage was prepared by first freeze-drying the iron source on a water soluble carbohydrate, specifically, Mor-Rex. The percent concentrations indicated below represent percentages by weight of the total dry composition.

| | |
|---|---|
| Iron required (as FeCl$_3$ 6H$_2$O) | .041% |
| Freeze-dried Iron Powder (1 part FeCl$_3$/10 parts Mor-Rex) | .41% |
| Maltol | .048% |
| Adipic Acid | 1.9% |
| Sugar | 97.2% |
| Flavor | .08% |

The color of the dry mix was off white while the reconstituted beverage was red indicating that complexation with the ferric ion is essential for red color obtention. In addition, there was no off flavor present in the beverage indicating that the color is compatible with all components of a beverage system.

EXAMPLE III

A similar beverage prototype was prepared according to Example II except that, instead of pre-fixing the iron alone on a soluble carbohydrate, the color complex was formed by co-drying both the iron salt and Maltol on a water soluble carbohydrate, specifically Mor-rex. The approximate ratio of each to the other was 1:1:6 respectively. The concentrations indicated below represent percentages by weight of the total dry compositions.

| | |
|---|---|
| Freeze-dried Color | 0.270% |
| Adipic | 1.600% |
| Sugar | 98.000% |
| Flavor | 0.087% |

The color of the dry beverage mix after blending was a deep purple-red and, when reconstituted, gave a medium red color hue at a pH of 3. Again, the flavor of the beverage was not at all affected by the color complex indicating compatibility between the freeze dried complex and the remaining beverage ingredients.

EXAMPLE IV

An evaluation was made on the range of colors produced as the ratio of iron/maltol was varied. All evaluations were made in 100 ml. of room temperature water having a pH of 3.2.

TABLE I

| | MALTOL | | | |
|---|---|---|---|---|
| | 1.5 mg | 3.0 mg | 4.5 mg | 6.0 mg |
| 4 mg FeCl$_3$ . 6H$_2$O | wk. orange | med. red | med. red | med. red |
| 6 mg FeCl$_3$ . 6H$_2$O | wk. orange | med. red | deeper red | deeper red |
| 8 mg FeCl$_3$ . 6H$_2$O | wk. yellow | med. red | med. red | deeper red |
| 16 mg FeCl . 6H O | wk. yellow | med.red/purple | burgundy | deeper red |

As is apparent, the higher the ratio of maltol to ferric iron, the deeper the color, or conversely, the lower the proportion of iron to maltol the more red the color. Generally, a 1:1 ratio of iron/3,5 hydroxy, 4-pyrone-structured compound/respectively has been determined to be the point at which red color is initiated.

It will be appreciated that the various examples, conditions, and the like are intended for illustrative purposes, and that obvious variations and modifications may be made without departing from the scope and spirit of the invention as defined in the appended claims.

Having thus described the invention, what is claimed is:

1. A method of imparting a red-hue color to edible materials which comprises adding to said edible materials a coloring composition consisting of at least one ferric salt complexed in situ or not with at least an equal weight amount of at least one 3 or 5-hydroxy, 4-pyrone-structured compound, in an amount effective to impart red color to said edible materials.

2. The method of claim 1 wherein the ferric salt and the 3 or 5-hydroxy, 4-pyrone-structured compound are present in respective weight ratio of about 1:2.

3. The method of claim 1 wherein the 3 or 5-hydroxy, 4-pyrone-structured compound is selected from the group consisting of maltol, isomaltol, ethyl maltol, and kojic acid.

4. The method of claim 1 wherein the ferric salt is selected from the group consisting of ferric chloride, ferric sulfate, and ferric nitrate.

5. The method of claim 1 wherein the edible material is a beverage.

6. The method of claim 1 wherein the edible material is pet food.

7. A colored edible material which comprises the edible material and a coloring agent which coloring agent consists of at least one ferric salt complexed with at least one 3 or 5-hydroxy, 4-pyrone-structured compound, the amount of coloring agent present in the edible material being effective to impart a red-hue to said edible material.

8. The edible material of claim 7 wherein the ferric salt and the 3 or 5-hydroxy, 4-pyrone-structured compound are present in respective weight ratio of about 1:2.

9. The edible material of claim 7 wherein the 3 or 5-hydroxy, 4-pyrone-structured compound is selected from the group consisting of maltol, isomaltol, ethyl maltol, and kojic acid.

10. The edible material of claim 7 wherein the ferric salt is selected from the group consisting of ferric chloride, ferric sulfate, and ferric nitrate.

11. The edible material of claim 7 wherein the edible material is a beverage.

12. The edible material of claim 7 wherein the edible material is pet food.

* * * * *